3,105,016
**PROCESS OF PRODUCING BROMO-
TETRACYCLINE**
Albert Peter Doerschuk, Westwood, N.J., and Barbara Ann Bitler, Stony Point, and Milton Andrew Petty, Pearl River, N.Y., assignors to American Cyanamid Company, New York, N.Y., a corporation of Maine
Filed Apr. 25, 1956, Ser. No. 580,663
1 Claim. (Cl. 195—80)

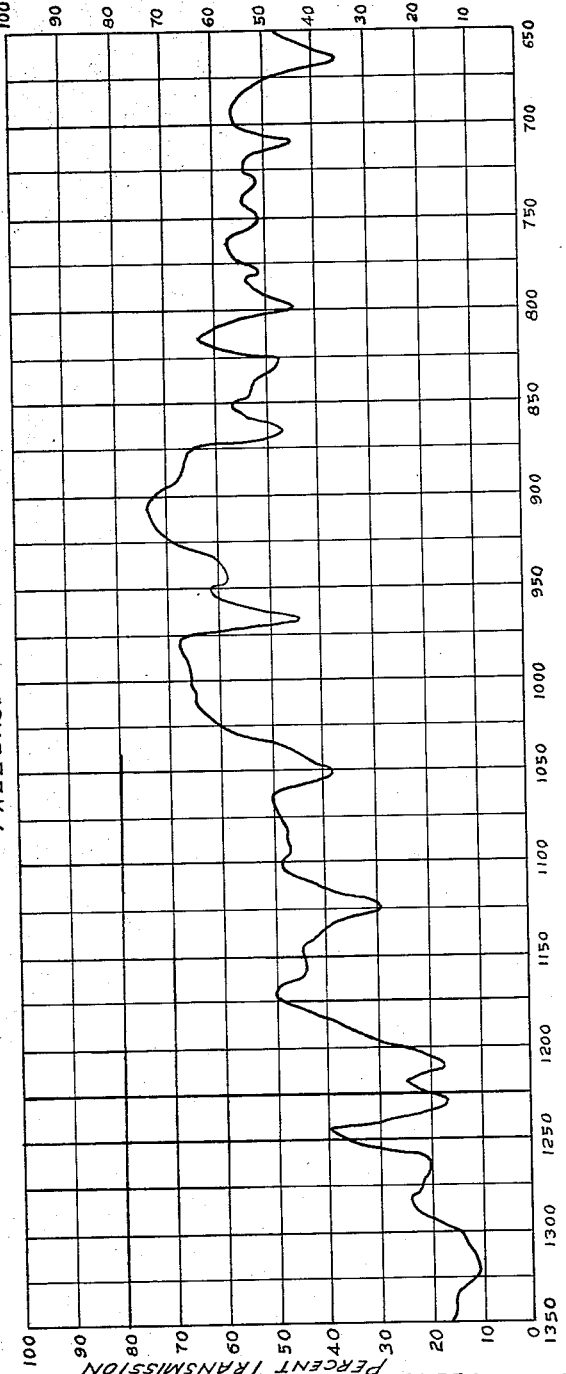

This invention relates to bromtetracycline and its production. More particularly, it relates to a process for the production of bromtetracycline by fermentation and the recovery of bromtetracycline and production of its salts, complexes and esters.

This application is a continuation-in-part of our application Serial No. 388,604, filed October 27, 1953, now abandoned.

Bromtetracycline is 7 - bromo-4 - dimethylamino-1,4,4a,5,5a,6,11,12a - octahydro - 3,6,10,12,12a - pentahydroxy-6-methyl - 1,11 - dioxo - 2 - naphthacenecarboxamide. Structurally, it differs from tetracycline by having a bromine atom in the 7 position on the naphthacene ring. The structure of the compound is proved by reduction of bromtetracycline to tetracycline and by degradation to give products which are analogous to those produced in the degradation of tetracycline and chlortetracycline.

Bromtetracycline is amphoteric and forms salts with acids and with bases. Its acid salts are, generally speaking, water soluble, bromtetracycline hydrochloride for example having a solubility in water of approximately 13,620 γ/ml. In normal butanol this salt has a solubility of approximately 384 γ/ml. and in this solvent is considerably more soluble than is chlortetracycline. Bromtetracycline is soluble in dilute acids. It is less soluble in aqueous solutions near neutrality. Its alkali, amine and ammonium salts are water soluble; but its alkaline earth salts such as calcium, barium, strontium, and magnesium are water insoluble.

Bromtetracycline is more stable in acids than is chlortetracycline. For example, in 0.2 N sulfuric acid at 100° C. bromtetracycline has a half life of 18.8 minutes as compared with 8.2 minutes for chlortetracycline under the same conditions. On the other hand, bromtetracycline is less stable under alkaline conditions than is chlortetracycline. This is an advantageous property for some uses, for instance in the treatment of meat—especially pork—fowl, and fish wherein it is desirable to have the antibiotic decompose before consumption.

The optical rotation of bromtetracycline in 0.03 N hydrochloric acid at room temperature is −205°, while that of chlortetracycline is −235°.

Bromtetracycline hydrochloride does not melt but decomposes when heated at 235° C. Chlortetracycline hydrochloride decomposes at about 210° C. under similar conditions.

Bromtetracycline has an infrared absorption spectra resembling that of chlortetracycline in many particulars. There are differences in the absorption intensity ratios such as would be expected in a compound of this type wherein the chlorine atom has been replaced by the higher molecular weight bromine atom. One major difference in the absorption spectrum occurs in the range of 800 cm.$^{-1}$. An absorption triplet occurs in the spectrum of chlortetracycline but does not appear in the absorption spectrum of bromtetracycline. The accompanying drawing is a draftsman's reproduction of the infrared absorption spectrum of bromtetracycline between 650 and 1350 cm.$^{-1}$.

The antibiotic spectrum of bromtetracycline is similar to chlortetracycline in some respects but does possess distinct differences, as will be seen from the following table. A sample of bromtetracycline tested for its antibiotic spectrum of activity by a streak plate test in parallel with a sample of chlortetracycline shows the following minimal concentrations capable of complete inhibition (micrograms per milliliter):

TABLE

|  | Chlortetracycline | Bromtetracycline |
|---|---|---|
| Bacillus cereus | 0.39 | 0.31 |
| Bacillus subtilis | 0.39 | 0.31 |
| Escherichia coli 22 | 1.56 | 1.25 |
| Escherichia coli 9637 | 6.25 | 2.5 |
| Mycobacterium phlei | 0.78 | 1.25 |
| Mycobacterium ranae | 0.78 | 0.62 |
| Mycobacterium sp. 607 | 0.78 | 0.62 |
| Proteus vulgaris | 3.12 | 1.25 |
| Salmonella gallinarum | 6.25 | 2.5 |
| Sarcina lutea | 0.39 | 0.31 |
| Staphylococcus aureus | 0.39 | 0.31 |
| Streptococcus agalactiae | 0.78 | 1.25 |
| Streptococcus hemolyticus | 0.39 | 0.31 |

The new antibiotic, bromtetracycline, is produced by the growth of the organism *Streptomyces aureofaciens*, including natural and induced mutants, in a nutrient medium containing bromide ions and preferably a minimum of chloride ions. The organism *S. aureofaciens* is described at length in a United States patent to Benjamin M. Duggar, 2,428,055, entiled Aureomycin and Preparation of Same, September 13, 1949.

Viable cultures of *S. aureofaciens* are on deposit with the National Regional Research Laboratories at Peoria, Illinois, listed as NRRL 2209 and at the American Type Culture Collection in Washington, D.C., catalogued as ATCC Nos. 10762a, 10762b, 12416c, 12416d, and 10762i. These cultures are available to the public for experimental purposes. All will produce bromtetracycline under proper fermentation conditions, as will be described hereinafter.

Natural and induced mutants can be selected which give higher yields of bromtetracycline than others. Such usual techniques as ultraviolet irradiation, exposure to the nitrogen mustards, and X-ray irradiation, etc., result in induced mutation. By selecting a mutant which gives higher yields of bromtetracycline, the efficiency of the fermentation procedures can be improved.

The production of bromtetracycline by the organism *S. aureofaciens* is most surprising in view of the complex nature of the product chlortetracycline which is produced by the same microorganism in ordinary fermentation media containing chloride ions. The unexpectedness of this result is further emphasized by the known fact that *S. aureofaciens* will produce tetracycline in a fermentation medium in which the chloride ions have been excluded. Very few fermentation processes result in the production of bromine-containing products, and very few antibiotics containing bromine have been reported. It is surprising, therefore, that an antibiotic having bromine in the molecule can be produced by *S. aureofaciens* under the conditions which will be more particularly described hereinafter.

Almost any strain of *S. aureofaciens* will produce some bromtetracycline under appropriate conditions. In view of the fact that most strains tend to use chlorides in the fermentation system to produce chlortetracycline, such strains are often referred to as chloride scavaging strains; and as other strains will produce substantial quantities of tetracycline, as well as chlortetracycline, even in the presence of adequate amounts of chlorides, such strains being known as chlorides ignoring strains, it is desirable that care be taken in selecting the strain of *S. aureo-*

*faciens* that is used in the fermentation process. Best results are obtained, that is the highest yield of bromtetracycline and the lowest proportion of chlortetracycline and tetracycline, when one uses a chloride scavaging strain of *S. aureofaciens* in a fermentation medium containing a relatively large amount of bromide ions and low amounts of chloride ions. Inasmuch as 1 part by weight of bromide ion in the medium can result in the production of approximately 6.8 parts by weight of bromtetracycline and as yields as high as 10,000 parts per million of bromtetracycline can be expected in the fermentation liquor under very favorable conditions, it will be seen that the medium should contain up to at least about 1500 parts by weight of bromide ions when using high-yielding strains. Bromide ion is preferably furnished in the form of a soluble bromide such as potassium bromide, sodium bromide, ammonium bromide or the like. In order that the process may be economic there should be at least 50 parts per million bromide ion in the fermentation medium. It is preferred, of course, that the medium contain more bromide ion, preferably over 100 parts per million.

As noted above, the chloride ion content of the medium should be as low as possible. With high bromtetracycline producing strains of *S. aureofaciens* and a favorable fermentation medium and conditions whereby high yields of bromtetracycline are produced as much as 50 parts per million of chloride ion may be tolerated in the fermentation medium. This low chloride ion content assures the formation of a minimum amount of chlortetracycline with chloride scavaging strains of *S. aureofaciens*. Ordinarily, less chloride ion is preferred and may be necessary where the conditions of the fermentation, including the strain of *S. aureofaciens* used, the composition of the medium and the fermentation medium are such that the yield of bromtetracycline is low; that is, around 1000 parts per million in the final fermentation medium. We prefer, of course, conditions in which bromtetracycline is the predominating antibiotic; that is, at least 50 percent of the total antibiotic content of the medium at the end of the fermentation.

Other than careful control of the bromide ion content and the chloride ion content of the medium, as described above, the composition of the fermentation medium, the method of inoculating the medium with *S. aureofaciens*, temperature, time, rate of aeration, hydrogen ion concentration and other conditions of the fermentation are substantially the same as those used in the production of other antibiotic substances such as chlortetracycline. The fermentation media and conditions of fermentation shown in United States Patent No. 2,482,055, Duggar, and 2,789,672, Petty, are satisfactory for the production of bromtetracycline except for chloride and bromide content which should be adjusted as described herein.

The formation of bromtetracycline during the fermentation may be followed by chemical or biological assays. Analysis of the product for bromine and chlorine will, of course, give the relative proportions of the two antibiotics in a mixture. Unfortunately, there is no single biological method presently available which will directly assay the bromtetracycline content of the fermentation medium. The fluorometric method used for the assay of chlortetracycline, note Journal of the American Pharmaceutical Association, Science Edition, 38, p. 473 (1949), may also be used for the assay of bromtetracycline with certain modifications. Pure bromtetracycline hydrochloride gives only 26 percent of the chlortetracycline hydrochloride response; and the result must be multiplied by a factor of 3.84. Tetracycline does not respond to this assay method, and the method will not show how much tetracycline is present along with the bromtetracycline and chlortetracycline.

Fortunately, other methods are known for the assay of tetracycline to which bromtetracycline and chlortetracycline do not respond. One way of determining the bromtetracycline content of a fermentation mash is to run a shake flask fermentation in a medium containing no bromide ions. The antibiotic activity as determined by the fluorometric method can then be ascribed to chlortetracycline. Having determined the amount of chlortetracycline present in the medium by one of the several methods available, the bromtetracycline may be easily determined by measuring the total fluorometric response and subtracting the calculated chlortetracycline response therefrom.

The refining of the bromtetracycline may be accomplished by using procedures similar to those used with chlortetracycline. The bromtetracycline, as its alkaline earth salts, may be separated from an aqueous solution. The isolated bromtetracycline may be purified to separate out any tetracycline or chlortetracycline by countercurrent distribution or chromatographic columns. In countercurrent distribution a butanol-water solvent system at a pH of about 2.5 gives a separation. The tetracycline may also be separated in a partition chromatographic column by using a diatomaceous earth such as is sold under the trade name "Celite" which has been dampened with water. A mixture of chloroform and butanol at a pH of 2.5 may be used as the elution solvent. Bromtetracycline comes off of the column ahead of tetracycline.

The following specific examples show production and recovery of bromtetracycline.

Example I

A casein digest is formed by digesting 5 grams of casein with 0.85 milliliter of sulfuric acid in 100 milliliters of water with stirring at 50° C. for 60 minutes and at 120° C. for 120 minutes in an autoclave. The digested casein is neutralized to a pH of 6.0 with aqueous ammonia, approximately 2.5 milliliters being required.

A basal medium is prepared containing per liter the casein digest from 5 grams of casein and the following:

| | |
|---|---|
| Magnesium lactate _____grams__ | 3.5 |
| Calcium carbonate _____do____ | 2.5 |
| $NaH_2PO_4 \cdot H_2O$ _____do____ | 2.2 |
| Sucrose _____do____ | 15.0 |
| $FeSO_4 \cdot 7H_2O$ _____milligrams__ | 40.0 |
| $CuSO_4 \cdot 5H_2O$ _____do____ | 32.0 |
| $MnSO_4 \cdot 4H_2O$ _____do____ | 20.0 |
| $ZnSO_4 \cdot 7H_2O$ _____do____ | 20.0 |
| Cobalt acetate _____do____ | 5.0 |

To this medium is introduced potassium bromide in the quantities shown and the following potencies are obtained.

| Potassium bromide, grams per liter: | Antibiotic activity, units |
|---|---|
| 0.0 | 307 |
| 0.1 | 415 |
| 0.2 | 450 |
| 0.4 | 430 |

The units of assay are an antibiotic activity against *Staphylococcus aureus* equal to that of one microgram per milliliter of chlortetracycline. The fermentation is conducted at 27° C. for 72 hours with agitation and aeration.

Example II

A medium having a minimum halide content is prepared having the following composition in milligrams per liter:

| | |
|---|---|
| Sucrose _____ | 30,000 |
| D,L-alanine _____ | 450 |
| L-arginine _____ | 570 |
| D,L-methionine _____ | 200 |
| L-glutamic acid _____ | 260 |
| L-histidine _____ | 200 |
| D,L-beta-asparagine _____ | 200 |

| | |
|---|---:|
| $(NH_4)_2SO_4$ | 2,000 |
| Magnesium lactate | 5,000 |
| $NH_4H_2PO_4$ | 2,000 |
| Potassium lactate | 2,000 |
| $MgH_4(PO_4)_2$ | 1,000 |
| Calcium carbonate | 5,000 |
| $FeSO_4.7H_2O$ | 60 |
| $ZnSO_4.7H_2O$ | 33 |
| $MnSO_4.H_2O$ | 19 |
| $CuSO_4.5H_2O$ | 5 |
| $Co(CH_3CO_2).6H_2O$ | 5 |

The solution is made up to volume with water distilled over sodium hydroxide. All of the constituents, except calcium carbonate are dissolved, the pH adjusted to between 6.2 and 6.3 with 3 N ammonia water (approximately 3 milliliters per liter) and the calcium carbonate added. The medium does not give a precipitate with nitric acid and silver nitrate, showing the chloride ion concentration to be below 0.17 milligram per liter.

One-hundred milliliter aliquots of the basic medium are placed in 500 milliliter Erlenmeyer flasks, stuffed with cotton plugs and autoclaved for 15 minutes at 120° C. Ten milliliters of sterile distilled water are added to each of four agar slant spore tubes containing *S. aureofaciens* in the sporulated form. The spores are gently scraped off with a sterile wire loop and the spore suspensions combined. The flasks are each inoculated with 5 milliliters of this suspension and agitated for 24 hours at 27° C., forming an inoculum.

6.3 liters of the medium and 35 milliliters of mineral oil are placed in a fermentor equipped with a stirrer and an aerator and sterilized. Seven 24-hour inoculum flasks and 50 milliliters of a sterile aqueous solution containing 0.97 gram of potassium bromide are sterilely added to the fermentor. Fermentation is conducted at 27.4° C., an agitator speed of 350 r.p.m. and an air flow of 7 liters per minute. The air is passed through first a nitric acid and then a silver nitrate scrubber, then a water scrubber, and a sterilizing filter. A polymeric silicone foam inhibitor is added as required (General Electric Silicone SS24).

As the growth develops, the pH slowly drops and the fermentation is continued until the pH ceases dropping and starts to rise. This takes about 51 hours and results in a final solution with a pH of 5.90. The final mash assays 412 units of antibiotic activity.

*Example III*

The final mash is acidified to a pH of 1.5 with stirring with concentrated hydrochloric acid, approximately 98 milliliters being required. Ninety-five grams of the filter aid sold under the trade name "Hyflo" are added to the mesh and the mixture is filtered through a "Hyflo"-precoated (62 grams) Büchner funnel.

The filter cake is slurried with 1400 milliliters of distilled water at 50° C. The slurry is filtered and the filtrates combined. 94.4 percent of the mash activity is recovered in the filtrate. The pH of the filtrate is adjusted to 2.5 with 50 percent sodium hydroxide (32 milliliters) and the mixture concentrated in vacuo at a temperature of between 25° C. and 30° C. to a final volume of 2070 milliliters. 83.6 percent of the mash activity remains. The pH is adjusted to 1.5 with concentrated hydrochloric acid and 331 grams of sodium chloride added. The solution is extracted twice with 311 milliliter portions of n-butanol and three times with 207-milliliter portions of n-butanol. The extracts are combined and the pH adjusted to 2.5 with 50 percent sodium hydroxide and the mixture distilled in vacuo under nitrogen with water additions until all of the n-butanol is azeotropically distilled off. The pH is adjusted to 1.5 with concentrated hydrochloric acid, 5 grams of filter-aid ("Hyflo") added and the mixture filtered through a sintered-glass funnel. A final aqueous volume of 1100 milliliters containing 70.5 percent of the mash activity results.

To this filtrate is added 41.5 grams of barium chloride dihydrate dissolved in 119 milliliters of distilled water. The mixture is stirred for one-half hour, the pH adjusted to 8.5 with sodium hydroxide and the mixture centrifuged. The resultant cake is washed with 40 milliliters of distilled water. The washed cake is slurried with 249 milliliters of distilled water, the pH adjusted to 2.5 with 50 percent sulfuric acid and the mixture stirred vigorously for an hour, the pH adjusted to 1.5 with 50 percent sulfuric acid, again stirred for one-half hour and then centrifuged. The precipitate is washed by centrifugation with 15 milliliters of 0.1 N sulfuric acid twice, the first time with grinding. The combined supernatants, measuring 260 milliliters contain 62.5 percent of the mash activity.

The above procedure is repeated and the two supernatants combined. The pH of the mixture is adjusted to 3.5 with 10 percent sodium hydroxide, the mixture stirred for 10 minutes and centrifuged. The precipitate is washed with 10 milliliters of water and the wash water added to the supernatant. The pH of the combined solutions is adjusted to 4.95 with 10 percent sodium hydroxide and the precipitate collected and washed. The precipitate is frozen and the remaining water removed by sublimation. 2.65 grams of a product analyzing 490 units of activity and containing 5.43 percent of bromine is obtained.

A Craig countercurrent distribution machine containing 30 tubes is loaded with a solvent system consisting of equal volumes of distilled water and n-butanol saturated with each other, adjusted to a pH of 2.5 with concentrated hydrochloric acid. 1.55 grams of the frozen and dried product is slurried with 160 milliliters of the aqueous phase, the pH readjusted to 2.5, 160 milliliters of the n-butanol phase added, and the pH again adjusted to 2.5 with stirring. The mixture is filtered, the phases allowed to separate and 50 milliliters of each phase are added to each of the first three tubes of the Craig machine. The remaining tubes are loaded with 50 milliliters of the n-butanol saturated aqueous phase, the distribution carried out until the upper phase, initially in tube 2 is equilibrated in tube 29. The distribution is continued until 18 upper phase withdrawals are made from tube 29. This brings activity into tube 29.

A spectrophotometric examination shows two peaks; the first centering about tube 12 with an optical maximum at 355 to 365 millimicrons and the second centering about tube 21 with an optical maximum at 370–375 millimicrons. The solutions from tubes 18 through 29 containing the bulk of the material of the second peak are combined and distilled in vacuo under nitrogen with water addition at a pH of 2.5 to a final n-butanol free aqueous solution of 50 milliliters. The pH is adjusted to 1.5 with hydrochloric acid, filter-aid added and the mixture filtered. The pH of the solution is then adjusted slowly with stirring to 5.0 with 10 percent sodium hydroxide, the mixture shaken with glass beads and allowed to remain overnight at 4° C. The solution is centrifuged and the supernatant frozen and dried, yielding 200 milligrams of a dry product. 152 milligrams of this product is dissolved in 1.4 milliliters of dry 2-ethoxyethanol and filtered. 0.14 milliliter of water are added and the mixture placed in a shaker. The material crystallizes and the crystals are filtered, washed and dried. The first crop yields 49 milligrams of brometetracycline. The crystals have an elemental analysis of 13.0 percent bromine as contrasted with a theoretical bromine content of 15.2 percent.

Bromtetracycline may be utilized in various ways. For example, the fermentation mash may be added directly to animal feeds for the stimulation of growth and/or the control of disease. The fermentation mash may be filtered with or without acidification and the clear liquor added to drinking water or animal feeds for the same purposes. The liquid containing the bromtetracycline may be concentrated under reduced pressure or by spray drying and the antibiotic used in the crude form for growth stimulation or the control or treatment of diseases in man, animals, and fowls. The bromtetracycline may be recovered in a more highly purified state by using a variety of procedures which include in various orders the steps of adsorption, elution, solvent extraction, crystallization, precipitation in the form of insoluble salts as, for example, calcium, barium, strontium, magnesium salts or as insoluble salts with sulfates or sulfonic acids of the wetting agent or azo dye type; or the bromtetracycline may be extracted with solvents either directly or with carriers such as the sulfates or sulfonic acids of the wetting agents or the azo dye type. In processes in which the bromtetracycline is extracted from an aqueous phase, organic solvents such as the lower alcohols, alkoxy alcohols, esters, and ketones may be used. These solvents should be immiscible with the aqueous layer. Certain solvents such as isopropyl alcohol which are normally miscible with water become immiscible with the aqueous layer if the aqueous layer has dissolved therein a water-soluble organic layer insoluble salt such as ammonium, amine, or alkali metal, halides and sulfates. These procedures have previously been used in the recovery of chlortetracycline.

An effective rapid separation is to acidify the mash to a pH of about 1.5 with hydrochloric acid and filter, adjust the filtrate to a pH of 2.5 and concentrate in vacuo. The concentrate is saturated with sodium chloride and extracted with butanol. The butanol extract is azeotropically distilled with the addition of water to give an aqueous solution. Barium chloride is added to the aqueous solution and the pH adjusted to about 8. The precipitated barium bromtetracycline is separated and redissolved in aqueous sulfuric acid at a pH of about 1.5, and the solids removed. The solution is fractionally precipitated with sodium hydroxide and that fraction collected which precipitates between 3.5 and 5.

The bromtetracycline thus isolated may be further purified by separation in a countercurrent extraction apparatus of the Craig type using a water-butanol system at a pH of about 2.5 (hydrochloric acid) and the fraction collected containing the bromtetracycline. The bromtetracycline may be then recrystallized from 2-ethoxyethanol and the crystals collected.

Another rapid short refining procedure is based on acidifying the mash, adding a long chain alkyl sulfate, such as Tergitol-4 (sodium tetradecylsulfate) and extracting with ethylene dichloride. The extract is concentrated under vacuum. 2-ethoxyethanol, ammonium chloride, and hydrochloric acid are added, and the hydrochloride of bromtetracycline is separated by diluting out the solvents with ethyl ether and collecting the then precipitated bromtetracycline hydrochloride. This material may be dissolved in water, the pH adjusted to 7.1 and free bromtetracycline recovered therefrom.

The bromtetracycline may be converted to an acid salt such as the hydrochloride, the sulfate, or the hydrobromide by adding these acids to a solution of the free material; or the sodium or calcium or other metallic or amine salt may be formed by adding a soluble compound of the metal or amine such as sodium hydroxide or calcium lactate to a solution of the bromtetracycline, adjusting the pH if necessary, and separating the desired metallic or amine salt.

Example IV
CONVERSION OF NEUTRAL TO HYDROCHLORIDE

One gram of bromtetracycline neutral was slurried in 5 ml. of 2-ethoxyethanol. To the slurry, 0.2 ml. of 12 N hydrochloric acid was added, and the resultant solution was seeded with a few crystals of bromtetracycline hydrochloride. On standing for 5 hours at room temperature and 17 hours at 4° C., a crop of crystals formed which was filtered, washed with 2-ethoxyethanol and acetone, and air-dried. A yield of 0.89 gram of bromtetracycline hydrochloride assaying 865 γ/mg. was obtained.

Example V
TRICHLORACETATE SALT OF BROMTETRACYCLINE 250 milligrams of bromtetracycline hydrochloride was slurried in 4 milliliters of water, and 1 milliliter of a 20 percent trichloracetic acid aqueous solution was added to adjust the pH to 1.15. At no time was solution complete, but a transformation in visual appearance was observed. After standing for 30 minutes at room temperature, the product was filtered, washed twice with 3 milliliters of water, and dried in vacuo at 40° C. for 20 hours. A yield of 117 milligrams of bright yellow bromtetracycline trichloracetate was obtained. Under the microscope, the product appeared as short rod-shaped crystals. On a hot stage, the salt gradually decomposed, turning dark orange, and started to melt with decomposition at about 160° C.

Example VI
CALCIUM SALT OF BROMTETRACYCLINE

To a suspension of 250 milligrams of bromtetracycline hydrochloride in 1.8 milliliters of methanol, 0.2 milliliter of triethylamine was added, and the mixture was stirred until a complete solution formed. To this was added a solution of 150 milligrams of calcium lactate in 0.6 milliliter of methanol. On stirring, a thick yellow precipitate formed, which was filtered, washed with methanol and water, and vacuum dried for 18 hours at 40° C. A yield of 238 milligrams of amorphous or microcrystalline calcium salt was obtained. The product melted with decomposition at about 150° C.

Example VII
AMMONIUM SALT OF BROMTETRACYCLINE 250 milligrams of bromtetracycline hydrochloride was slurried in 0.25 milliliter of concentrated aqueous ammonia and 0.5 milliliter of water. An amorphous yellow precipitate formed, but crystallized on the addition of 0.5 milliliter of acetonitrile in the form of short rods. After standing for about one hour, slight agitation caused the crystalline ammonium salt to redissolve.

Example VIII
CONVERSION OF HYDROCHLORIDE TO NEUTRAL

A 1.0 gram sample of bromtetracycline hydrochloride was slurried in 1 milliliter of 2-ethoxyethanol and 3.5 milliliters of water, and 0.5 milliliter of water containing 106 milligrams of sodium carbonate was added thereto. The pH of the mixture was 6.2. After stirring for 20 minutes, the crystalline product was filtered off, washed with water, and vacuum dried at 40° C. for 15 hours. A yield of 0.53 gram of light yellow neutral bromtetracycline assaying 827 γ/mg. (spectrophotometric; as chlortetracycline hydrochloride) was obtained.

Example IX
CATALYTIC REDUCTION TO TETRACYCLINE

A 301 milligram sample of bromtetracycline hydrochloride was slurried in 1.2 milliliters of a mixture of equal parts of n-butanol and 2-ethoxyethanol, and solution was effected by the addition of 0.204 milliliter of triethylamine. To the solution, 83.3 milligrams of 5 percent palladium on carbon was added, and the mixture was shaken in a hydrogen atmosphere until one equivalent of hydrogen was utilized, as indicated by the pressure drop. The catalyst was filtered off and rinsed with 1 milliliter of butanol. Concentrated hydrochloric acid was added to the filtrate to adjust the pH to 2.0, and the mixture was aged for 18 hours at room temperature.

The product was filtered, washed with chloroform and isopropanol, and vacuum dried to yield 188 milligrams of tetracycline hydrochloride assaying 922 γ/mg.

What we claim is:

The method of producing bromtetracycline which comprises the steps of inoculating an aqueous nutrient medium with a strain of *Streptomyces aureofaciens* and aerobically fermenting said aqueous nutrient medium until the major antibiotic content thereof is bromtetracycline, said medium containing at least 50 parts per million of bromide ions and being substantially free of chloride ions.

References Cited in the file of this patent

UNITED STATES PATENTS

| | | |
|---|---|---|
| 2,482,055 | Duggar | Sept. 13, 1949 |
| 2,516,080 | Sobin et al. | July 18, 1950 |
| 2,609,329 | Niedercorn | Sept. 2, 1952 |
| 2,699,054 | Conover | Jan. 11, 1955 |
| 2,734,018 | Minieri et al. | Feb. 7, 1956 |
| 2,736,725 | Ritter | Feb. 28, 1956 |
| 2,739,924 | Lein | Mar. 27, 1956 |
| 2,871,167 | Szumski | Jan. 27, 1959 |
| 2,878,289 | McCormick et al. | Mar. 17, 1959 |

FOREIGN PATENTS

| | | |
|---|---|---|
| 530,983 | Belgium | Aug. 7, 1954 |

OTHER REFERENCES

Porter: Bacterial Chem. and Physiology, 1946, Wiley, pages 621, 625.

Partington: Textbook of Inorganic Chemistry, Macmillan and Company, London, 1950, pages 317, 341–2.

Latimer and Hildebrand: Reference Book of Inorganic Chemistry, 3rd Edition, Macmillan Company, New York (1951), page 173.

Stephens et al.: "J. Am. Chem. Soc," volume 74, Oct. 5, 1952, pages 4977, 4976.

Chem. Eng. News, volume 30 (1952), page 4628.

Sensi et al.: Il Farmaco, volume 10, No. 6, pages 337–355 (June 1955).